United States Patent [19]

Hibino et al.

[11] Patent Number: 5,187,724
[45] Date of Patent: Feb. 16, 1993

[54] ABSOLUTE POSITION DETECTING DEVICE

[75] Inventors: Toshiharu Hibino; Chihiro Higuchi, both of Gifu, Japan

[73] Assignee: Teijin Seiki Co., Ltd., Osaka, Japan

[21] Appl. No.: 679,479

[22] Filed: Apr. 2, 1991

[30] Foreign Application Priority Data

Apr. 5, 1990 [JP] Japan .................................. 2-90543

[51] Int. Cl.⁵ .............................................. G01D 5/34
[52] U.S. Cl. ........................................ 377/17; 377/6; 377/49; 364/167.01
[58] Field of Search ............................ 377/17, 49, 6; 364/167.01; 250/231

[56] References Cited

U.S. PATENT DOCUMENTS

| 4,511,797 | 4/1985 | Pohlig et al. | 377/17 |
| 4,611,269 | 9/1986 | Suzuki et al. | 364/167.01 |
| 4,638,732 | 1/1987 | Salazar et al. | 377/49 |
| 4,755,729 | 7/1988 | Gotou | 364/167.01 |
| 4,955,305 | 9/1990 | Garnier et al. | 364/167.01 |
| 5,001,732 | 3/1991 | Nomura et al. | 377/49 |
| 5,004,981 | 4/1991 | Hashimoto et al. | 377/17 |

FOREIGN PATENT DOCUMENTS 1602818 5/1970 Fed. Rep. of Germany .
2021418 11/1970 Fed. Rep. of Germany .
2609337 9/1977 Fed. Rep. of Germany .

Primary Examiner—Stanley D. Miller
Assistant Examiner—Scott A. Ouellette
Attorney, Agent, or Firm—Sughrue, Mion, Zinn, Macpeak & Seas

[57] ABSTRACT

An absolute position detecting device in which the number of revolutions of a drive shaft adapted to drive an object to be controlled is counted with a counter for detecting an absolute position of the object. When a predetermined point on the object returns to an initial position after making one or more revolutions, the drive shaft is returned to an initial rotational angular position. A data rewriting operation is performed to rewrite, as necessary, the count value of the counter into a value obtained by subtracting a count value therefrom which is obtained during the one or more revolutions of the predetermined point.

10 Claims, 3 Drawing Sheets

ABSOLUTE POSITION DETECTING DEVICE

BACKGROUND OF THE INVENTION

This invention relates to an absolute position detecting device which is adapted to detect an absolute position of an endless rotating device such as an endless conveying device in an automatic tool exchanging device.

An automatic tool exchanging device of the type wherein a plurality of tools are rotated by an endless conveyance means such as an endless chain (herein referred to as "a chain") is well known in the art. In such automatic tool exchanging devices, the absolute position of the endless conveyance means, with respect to its starting point of revolution (or point of origin, or initial point), is determined by a controller that counts the number of revolutions and detects the absolute position within one revolution of a driving servo motor, so that the position of the next tool to be used can be indexed. In this manner, out of the plurality of tools, a targeted tool can be selected.

When the device is stopped because of a power supply failure, the absolute position detecting device is activated by an auxiliary power source, namely, a battery, to detect the position data of the device. The position data thus detected is then read by the controller when the power supply is restored. Thus, even if the device is stopped by a power supply failure, its remaining operation can be carried out successively when the power supply is restored.

FIG. 1 shows one example of a conventional absolute position detecting device as just described. In FIG. 1, reference numeral 1 designates a number-of-revolutions sensor which is coupled to a servo motor; reference numeral 2 designates a number-of-revolutions counter for counting the number-of-revolutions of the motor from the output signal of the sensor 1; and reference number 3 designates an absolute-position-within-one-revolution sensor. The output signals of the counter 2 and the absolute sensor 3 are applied to an absolute data register 4 whose output is then applied through a modem 5 to the above-described controller.

In the conventional absolute position detecting device thus described, the number of revolutions counted can accumulate to a point such that the number-of-revolutions counter 3 reaches its maximum count. This is a problem. In the case of a so-called "short-cut position indexing operation", a similar problem can arise. That is, when the device is used for a long period of time, the count value may be greatly increased in one of the directions of circulation, resulting in an overflow in the number-of-revolutions counter 3. It is, therefore, impossible to obtain the absolute position data.

SUMMARY OF THE INVENTION

Accordingly, an object of the present invention is to provide an absolute position detecting device in which, when an object to be controlled makes one or more revolutions so that its predetermined point returns to the initial position, the data corresponding to the one or more revolutions is subtracted from the count value, thereby preventing the counter from overflowing, with the result that the absolute position data is obtained.

The above and other objects of the invention are accomplished by providing an absolute position detecting device in which the number of revolutions of a drive shaft which drives an object to be controlled is counted directly or indirectly with a counter for detecting an absolute position of the object.

In accordance with the invention, when a predetermined point on the object returns to an initial position, after making one or more revolutions, the drive shaft is returned to an initial rotational angular position, and a data rewriting operation is performed to rewrite the count value of the counter into a value (as required), which is obtained by subtracting a count value therefrom which is obtained during the one or more revolutions of the predetermined point.

In the absolute position detecting device of the invention, the drive shaft is returned to its initial rotational angular position when the predetermined point on the object returns to its initial position after making one or more revolutions and the count value of the counter is rewritten into the value which is obtained by subtracting a count value therefrom which is obtained during the one or more revolutions of the predetermined point. Therefore, even when the object is revolved consecutively in one direction many times, the counter will not overflow.

The above and other objects, features, and advantages of the present invention will become more apparent from the following detailed description taken in conjunction with the accompanying drawings.

DESCRIPTION OF THE PREFERRED EMBODIMENTS

A first embodiment of the invention is shown in FIGS. 2 through 5, in which the inventive concept is applied to an automatic tool exchanging device.

Figure 2:
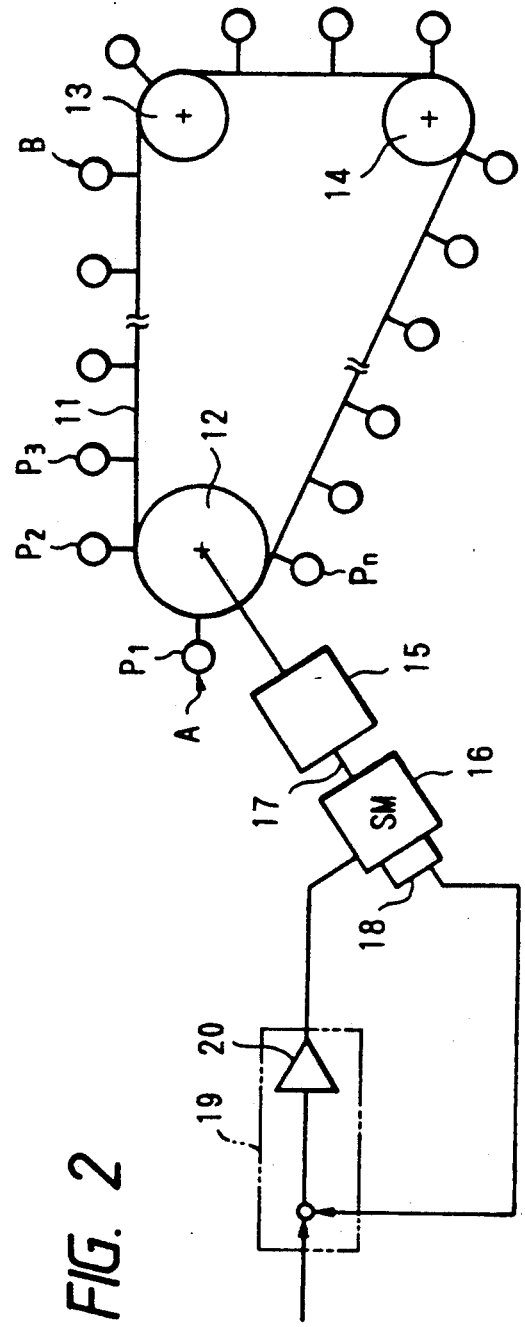
FIG. 2 is an explanatory diagram showing the entire arrangement of an absolute position detecting device according to the present invention.

In FIG. 2, there is shown an automatic tool exchanging device which includes an object 11, such as an endless chain, that is controlled by the device, a sprocket wheel 12, and idlers 13 and 14. The chain 11 is laid over the sprocket wheel 12 and the idlers 13 and 14 while being supported on the frame of the body of the automatic tool exchanging device (herein referred to as an "ATC"). A servo motor 16 is coupled to and drives the sprocket wheel 12 through a speed reducer 15 having a speed reduction ratio i (where, i=1/100, for example). The sprocket wheel 12 has a plurality of teeth $Z_1$ (e.g., ten teeth so that $Z_1=10$) on its periphery. The teeth of the sprocket wheel 12 are engaged with a plurality of chain links $Z_2$ (e.g., 1,000 chain links so that $Z_2=1,000$) forming the chain 11, so that the chain 11 can be revolved by rotating the sprocket wheel. As the chain 11 is revolved, a plurality of tool pots $P_1$ through $P_n$ (tools (not shown) are detachably held by the pots $P_1$ through $P_n$) mounted on the chain 11 at predetermined intervals are moved through a point of origin (or initial point) A and a tool exchanging point B provided for the ATC. Therefore, where the chain 11 makes one revolution clockwise or counterclockwise so that one tool pot $P_1$ returns to the point of origin A, the number of revolutions $N_1$ of the sprocket wheel 12 and the number of revolutions $N_2$ of the servo motor $N_2$ are as follows:

$$N_1 = Z_2/Z_1 = 1,000/10 = 100$$

$$N_2 = N_1/i = 100 \times 100 = 10,000$$

As is apparent from the above, the number of revolutions of the servo motor 16 (or the number of revolutions of the drive shaft) necessary for one revolution of the chain 11 is an integer. Hence, the relation between the tool pots $P_1$ through $P_n$ (i.e., objects to be controlled) and the angular positions of an encoder plate (described later) is such that, when a predetermined point on the object to be controlled makes one revolution to return to the point of origin A, the encoder plate returns to its own point of origin (or initial rotational angular point).

The servo motor 16 is provided with a conventional absolute type encoder 18 for detecting an absolute position within one revolution of its output shaft (or drive shaft) 17. The output signal of the encoder 18 is applied (i.e., feedback) to a servo driver 19 which includes a current control circuit (not shown) and a power amplifier 20. The servo driver 19 operates to drive the servo motor 16 in accordance with a signal representing the difference between an instruction signal provided by a controller 40 (described later) and the feedback signal provided by the encoder 18.

Figure 3:
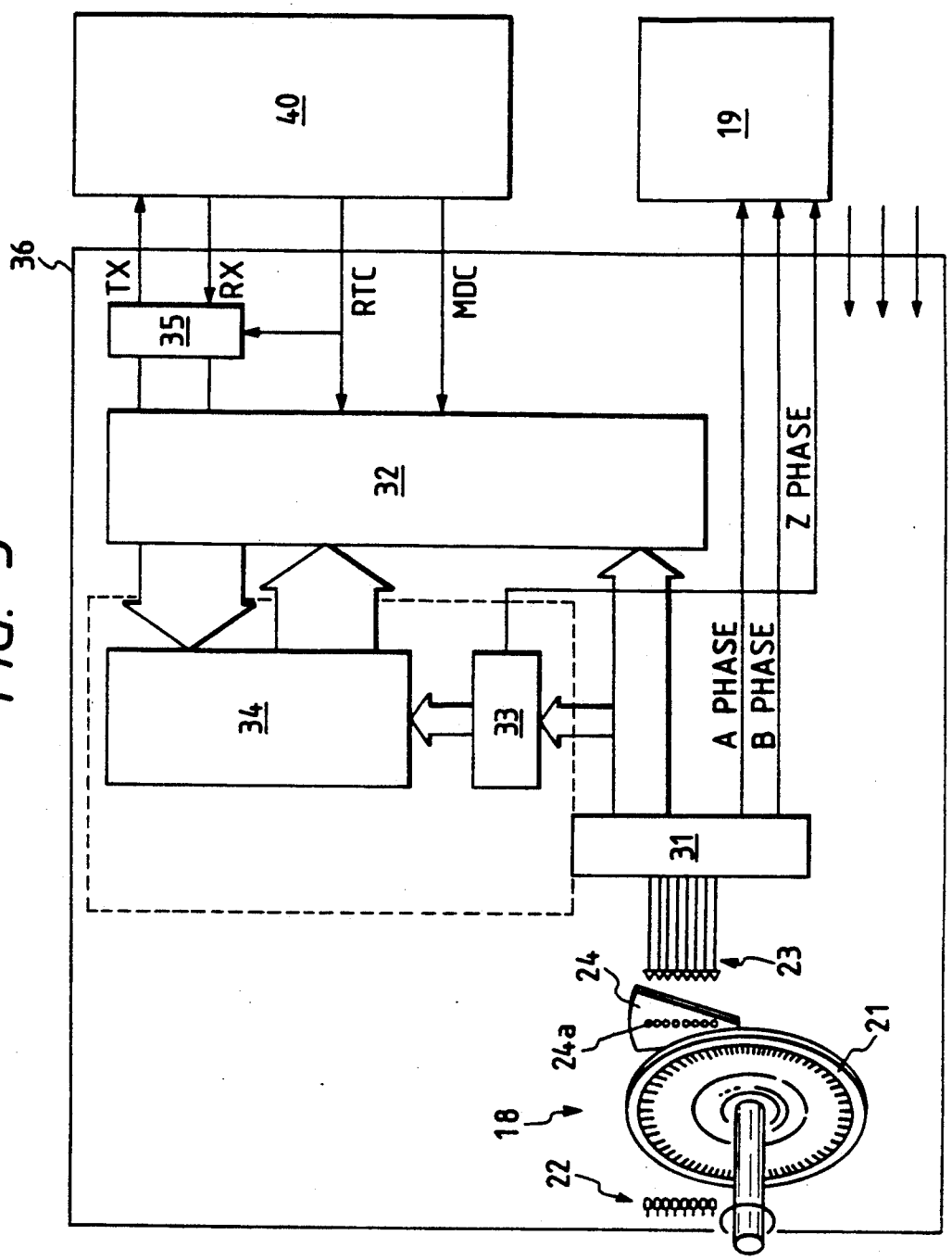
FIG. 3 is a block diagram showing a rotational position detecting circuit of the device shown in FIG. 2.

The encoder 18, as shown in FIG. 3, includes an encoder plate 21 which has a plurality of holes for forming absolute position signals corresponding to the angular positions and can be mounted directly or indirectly on the output shaft 17 of the servo motor 16, a plurality of light emitting diodes 22, a plurality of photo-diodes 23 respectively confronting the encoder plate 21 with the light emitting diodes 22, and a slit member 24 which has through-holes 24a which are substantially in alignment with the axes of the photo-diodes 23 and which is disposed between the encoder plate 21 and the array of photo-diodes 23. As the encoder plate 21 rotates, the output beams of the light emitting diodes 22 are selectively applied to the photo-diodes 23. That is, the absolute-position-within-one-revolution of the encoder plate 21 can be detected from the combination (or signal code) of the output signals of the photo-diodes which have detected the light beams. That is, the encoder 18 outputs, in a digital mode, a rotational angle in one revolution wherein, angle position zero of the encoder plate 21 is the coordinate origin.

In the initial setting, angle position zero corresponds to the instance of time when, for example, the tool pot $P_1$ is positioned at the point of origin A. In this case, the tool pot $P_1$ corresponds to the above-described predetermined point of the object to be controlled, and the angle position zero of the encoder plate 21 corresponds to the initial rotational angular position of the latter 21. Any one of the remaining pots $P_2$ through $P_n$ (or any point on the chain 11) may be designated as the predetermined point, and an angle position other than the angle position zero of the encoder plate 21 may be designated as the initial position.

The photo-diodes 23 are connected to a sensor amplifier 31. That is, the output signals of the photo-diodes 23 are applied through the sensor amplifier 31 to a data register 32 and through a direction determining unit 33 to a multiple rotation counter 34. When calculating an index coordinate value (described later), the data register 32 reads count data from the multi-rotation counter 34, and transfers serial data TX through a modem 35 to the controller 40. The data register 32 operates in response to a reception and transmission control instruction RTC and a modem control instruction MDC provided by the controller 40, for writing multi-rotation data (e.g., the number of revolutions) in the multi-rotation counter 34 in accordance with input data from the sensor amplifier 31 and a serial data RX received through the modem 35 from the controller. The writing of multi-rotation data in the multi-rotation counter 34 is to rewrite the multi-rotation data which is a count value of the multi-rotation counter 34, in accordance with the instructions (RTC and MDC) from the controller 40 and the data provided thereafter. This rewriting operation is to determine, irrespective of the direction of revolution of the chain 11, the value which is obtained by subtracting from the count value of the counter 34, the number of revolutions of the servo motor 16 for the period of time the predetermined point (for instance, the tool pot $P_1$) on the chain 11 makes one or more revolutions in one direction to return to the point of origin A.

The sensor amplifier 31, the data register 32, the direction determining unit 33, the multi-rotation counter 34, and the modem 25 form a rotational position detecting circuit 36, which cooperates with the encoder 18, to count the number of revolutions of the encoder plate 21 and to detect the absolute-position-within-one-revolution of the encoder plate 21.

The following signals are applied, as the position and rotation state signals of the encoder plate 21, to the servo driver 19. That is, the sensor amplifier 31 applies to the servo driver 19 an A-phase pulse signal and a B-phase pulse signal which are 90° out of phase from each other, while the direction determining unit 33 applies a Z-phase pulse signal corresponding to the zero position.

The direction determining unit 33 and the multi-rotation counter 34 are energized at all times, even when the power supply is unintentionally interrupted, so that the count value and the result of determination are maintained at all times.

The chain 11 revolves in one predetermined direction or in a direction of revolution which is the shortest distance between the tool exchanging point B and the tool to be used next. This allows the tool to reach the tool exchanging point B quicker (herein referred to as "a short-cut direction"). Hence, if the tool exchanging operation is performed repeatedly, the rotational coordinate of the chain 11 will be cumulatively increased or decreased even when the chain 11 revolves in the "short-cut" direction. Therefore, the cumulative increase or decrease of the rotational coordinate results in an increase or decrease in the count value of the multi-rotation counter 34.

In operation, as the sprocket wheel 12 is rotated by the servo motor 16 through the speed reducer 15, the chain 11 is driven, so that the tools held by the tool pots $P_1$ through $P_n$ are set to predetermined index positions. To carry this out, the servo driver 19 controls the servo motor 16 in response to an instruction signal from the controller 40 and a feedback signal from the encoder 18. The servo driver 19 controls the servo motor 16 in accordance with the indexing conditions such as the number (n) of tools (or indexing number), the number ($Z_1$) of teeth of the sprocket wheel 12, the number ($Z_2$)

of chain links, the reduction ratio (i) of the speed reducer 15, and the resolution power (for instance, 2048 pulses/rev) of the encoder 18.

As already described, the chain 11 revolves in one predetermined direction (e.g., the clockwise direction) or in the short-cut direction of revolution which is the shortest distance between the tool exchanging point B and the tool to be used next. Hence, if the tool exchanging operation is performed repeatedly, then the rotational coordinate of the chain 11 will be cumulatively increased or decreased even when the chain 11 revolves in the short-cut direction. Therefore, the cumulative increase or decrease of the rotational coordinate results in an increase or decrease (increase in the negative direction) in the count value of the multi-rotation counter 34.

If, for example, a power interruption occurs, (i.e., the power supply is interrupted during the operation of the ATC), the direction determining unit 33 and the multi-rotation counter 34 are automatically connected to an external battery, so that the result of the determination and the count value are maintained. When the power supply is restored, the controller 40 reads the position data so that the remaining tool exchanging operation can be completed.

Figure 4:
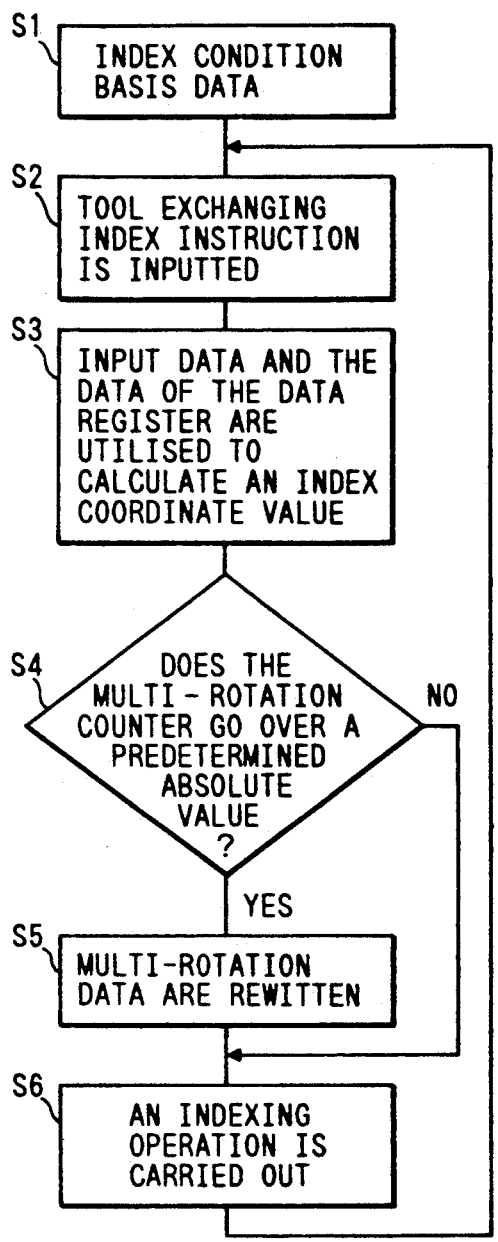
FIGS. 4 and 5 are flow charts illustrating the functions of control programs for the circuit shown of FIG. 3.

Referring to FIG. 4, the controller 40 rewrites, as necessary, the multi-rotation data of the multi-rotation counter in accordance with the following procedure. In Step S1, index condition basis data are inputted. In step S2, a tool exchanging index instruction is inputted, which is transmitted from the ATC body. In Step S3, the input data and the data of the data register 32, which have been read in the controller 40, are analyzed to calculate an index coordinate value. This calculation obtains the difference between the present coordinate value of the encoder plate 21 (i.e., the present data of the data register 32) and a targeted coordinate value (i.e., a targeted data value of the data register 32). That is, the calculation obtains an amount of rotation necessary for the servo motor 16 to reach the targeted tool pot. The coordinate value is set and calculated in accordance with the resolution of the encoder 18. In Step S4, it is determined whether, where the count value of the multi-rotation counter 34 is integrated until the targeted index position is attained, if the multi-rotation counter 34 exceeds a predetermined absolute value (e.g., the absolute value of 10,000, which is the number of revolutions of the servo motor required for the chain 11 to make one revolution). When the result of the determination is "No", then, Step S6, an indexing operation is performed.

Assuming that the indexing operations are performed several times in the above-described manner, such that the cumulative number of revolutions in one direction of the servo motor 16 is −9,000, then the multi-rotation data of the multi-rotation counter 34 is also −9,000. If, under this assumption, a rotation instruction (i.e., input data from Step S2) for the servo motor 16 in the next indexing operation is −2,000 revolutions, then at the end of the indexing operation a value expected for the multi-rotation data of the multi-rotation counter 34 is −11,000 (which is equalled to (−9,000) +(−2,000), and which exceeds the predetermined absolute value of 10,000). Hence, in Step 4, the result of the determination is "Yes". Thus, in Step S5, the internal coordinate data of the controller 40 and the multi-rotation data of the multi-rotation counter 34 are each rewritten into with (+1,000) which is obtained by subtracting (−10,000) which is the above-described predetermined absolute value of 10,000 from (−9,000) which is the current multi-rotation data of the multi-rotation counter 34. Thereafter, in Step S6, the indexing operation is performed, so that the servo motor 16 is caused to make −2,000 revolutions, to thus move the tool to the tool exchanging point B. At the end of this operation, the data value of the counter 34 is set to −1,000. In the above-described operation, the data of the counter 34 is rewritten immediately before the predetermined point on the chain 11 makes one revolution.

As is apparent from the above description, when the chain 11 makes one or more revolutions to cause the predetermined point on the chain 11 to return to the point of origin A, the encoder plate 21 is returned to the zero position, and the count data of the multi-rotation counter 34 is rewritten. That is, the predetermined absolute-value (the number of revolutions of the servo motor 16 for one rotation of the chain 11 (i.e., $N_2$)), either positive or negative depending on whether the current multi-rotation data is positive or negative, is subtracted from the current multi-rotation data of the multi-rotation counter 34. Hence, even if the chain revolves in one direction for a long period of time, the multi-rotation counter will not overflow, and therefore the absolute position data can be maintained.

In accordance with a second embodiment of the invention, the following indexing data may be used: the number of teeth of the sprocket wheel $Z_2=9$, the number of chain links $Z_2=1,000$, and the reduction ratio of the speed reducer i $=101$. In this case, when the sprocket wheel 12 makes 1,000 consecutive clockwise or counterclockwise revolutions (i.e., $N_1=1000$), the chain 11 makes nine revolutions $((Z_1 \times N_1)/Z_2=(9 \times 1,000)/1,000 =9)$ and the tool pot $P_1$ returns to the initial point A. In the encoder 18, the encoder plate 21 is set so as to return to the initial rotational angular position (or zero position) at the same time. Before an overflow occurs in the multi-rotation counter 34, that is, before the count value of the multi-rotation counter 34 exceeds its maximum count, the count value is rewritten. In other words, the count value obtained while the chain 11 makes nine revolutions (which is the same as the number of revolutions of the servo motor 16, i.e., (+101,000) when the sprocket wheel 12 makes 1,000 consecutive clockwise revolutions $(N_1 \times 1/i) = 1,000 \times 101 = 101,000)$, and (−101,000) when it makes 1,000 consecutive counterclockwise revolutions) is subtracted from the current multi-rotation data of the multi-rotation counter 34. Thus, in this case, the effect is the same as that in the above-described case.

Furthermore, with $Z_1=9$ and $i=101$, the number of chain links $Z_2$ may be set to 1,001. In this case, when the sprocket wheel 12 makes 1,001 consecutive revolutions (i.e., $N_1=1001$) in one direction, the chain 11 makes nine revolutions $(Z_1 \times N_1/Z_2 = 9 \times 1,001/1,001 = 9)$ so that the tool pot $P_1$ returns to the point of origin A. When the chain 11 has made nine revolutions, the absolute value $(N_1 \times (1/i))$ of the count value (i.e., the number of revolutions of the servo motor 16) of the multi-rotation counter 34 reaches $101,101 (= 1,001 \times 101)$.

Figure 1:
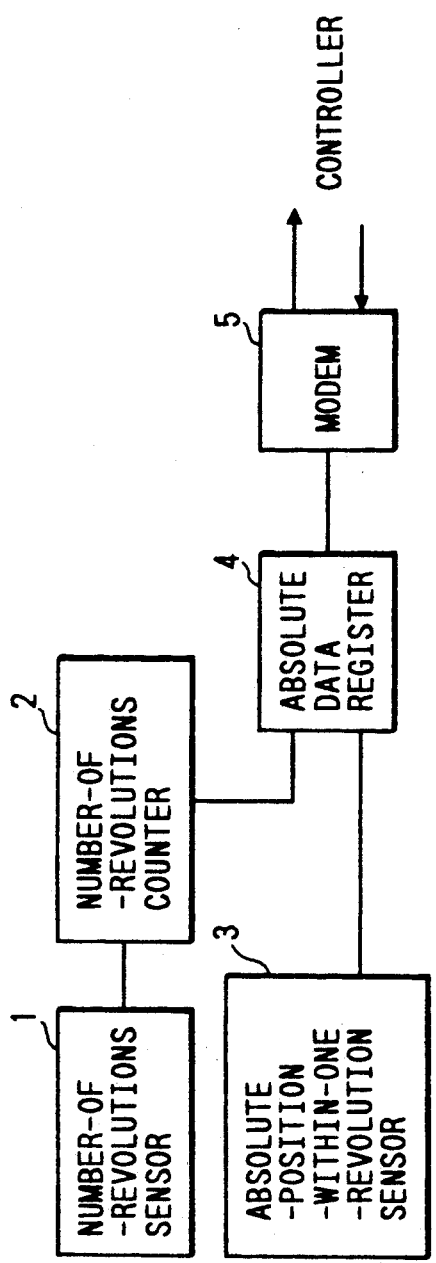
FIG. 1 is a block diagram illustrating a conventional absolute position detecting device.

In the above-described embodiment, the multi-rotation data of the motor output shaft 17, and the absolute position within one revolution are detected by using the absolute type encoder 18. However, the invention is not limited thereto or thereby. That is, for the same purpose, a number-of-revolutions sensor and a one-revolution absolute sensor may be employed as shown in FIG. 1.

Furthermore in the above-described embodiment, the number of revolutions of the motor output shaft 17 is counted (that is, it is used as a drive shaft for driving an object to be controlled) and is coupled to the encoder plate 21 which is part of the number-of-revolutions counting means. However, the invention is not limited thereto or thereby. That is, the number of revolutions of, for instance, the output shaft of the speed reducer 15 may be counted (that is, it may be used as a drive shaft for driving the object to be controlled). Similarly, the output shaft is coupled to a number-of-rotations detecting element such as an encoder plate.

In addition, in the above-described embodiment, Steps S4 and S5 are carried out before Step S6. That is, before the indexing operation is carried out (Step S6), it is first determined whether the multi-rotation data (or count data) of the multi-rotation counter 34 exceeds the predetermined value (Step S4), and, if so, the rewriting of the multi-rotation data is performed (Step S5). However, the invention is not limited thereto or thereby. That is, as shown in FIG. 5, after the indexing operation is carried out (Step S4'), the determination of whether the count value of the multi-rotation counter 34 exceeds the predetermined value (including the case where the count value reaches the predetermined value) (Step S5'), and, if necessary, the rewriting of the multi-rotation date may be carried out.

Figure 5:
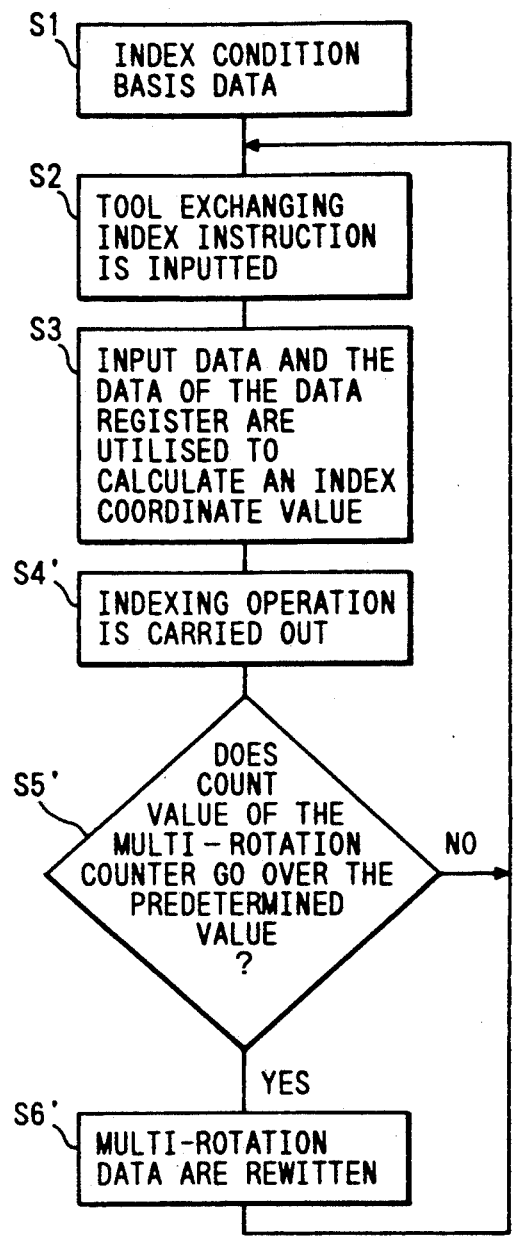

With reference to FIGS. 2, 3 and 5, a program will be described which is preferably utilized in the case where, the predetermined point on the chain 11 (or an object to be controlled) is driven continuously in one direction so that it passes through its initial position several times.

If the relationship between the chain 11 (or the object to be controlled) and the motor rotary shaft 17 (or the drive shaft) is such that when the predetermined point on the object returns to its initial position after making one revolution, the drive shaft also returns to its own initial rotational angular position, it is preferable to create a program so that, when the predetermined point, which is moved continuously in one direction, is stopped after passing at least once through its initial position (the indexing operation is accomplished), the count data of the counter 34 is rewritten into the value which is obtained by subtracting from the count value at that instant of time the product of the count value obtained during the one circulation of the predetermined point and the number of times of the predetermined point's passing through the initial position.

If the relationship between the chain 11 (or the object to be controlled) and the motor rotary shaft 17 (or the drive shaft) is such that when the predetermined point on the object returns to its initial position after circulating a plurality of times, the drive shaft returns to its own initial rotational angular position, it is preferable to create a program so that, when the predetermined point, which is moved continuously in one direction, is stopped after passing through its initial position at least the number of times which is the product of the aforementioned plurality of times and an integer (the indexing operation is accomplished), the count data of the counter 34 is rewritten into the value which is obtained by subtracting from the count value at the instance of time that the product of the count value obtained while the predetermined point revolves the plurality of times and the integer.

In addition, in each of these cases, the program should be created such that the count value for subtraction is limited to less than the count capacity of the counter 34. When the limit value is reached and as the object to be controlled is continuously driven, the continuous drive operation is automatically suspended and the above-described data rewriting operation is carried out.

The absolute value detecting device according to the invention is so designed that, when the predetermined point on the object to be controlled returns to the point of origin, making at least one revolution, the encoder plate is returned to its own point of origin, and the count data of the counter is rewritten into the value which is obtained by subtracting the count value which is obtained while the predetermined point makes one or more revolutions. Even if the object revolves consecutively in one direction, the counter can be prevented from overflowing, thereby maintaining the absolute position.

There has thus been shown and described a novel absolute position detector which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. An absolute position detecting device for detecting an absolute position of a predetermined point on an object, said absolute position detecting device comprising: driving means for controllably driving said object in a circular path; a counter means for producing a count value indicative of the number of revolutions of said driving means; and a rewriting means for performing a data rewriting operation wherein said count value is rewritten with a new value when said count value exceeds a predetermined value, said new value being less than said predetermined value.

2. The absolute position detecting device as claimed in claim 1, wherein said driving means comprises: servo motor having an absolute type encoder for detecting an absolute position within one revolution of a driving shaft of said servo motor; and servo driver responsive to a signal that is representative of the difference between an instruction signal provided by a controller and an output of said encoder.

3. The absolute position detecting device as claimed in claim 2, wherein said encoder further comprises: an encoder plate having a plurality of holes for forming absolute positions signals indicative of angular positions of said encoder plate, said encoder plate being directly or indirectly mounted on said driving shaft; a plurality of light emitting diodes; a plurality of photo-diodes respectively confronting said encoder plate and said plurality of light emitting diodes; and a slit member having through-holes that are substantially in alignment with the axes of said photo-diodes and disposed between said encoder plate and said plurality of photo-diodes, wherein, as said encoder plate rotates, output beams of said plurality of light emitting diodes are selectively applied to said plurality of photo-diodes, said plurality of photo-diodes outputting a signal representative of a rotational angle of said driving shaft.

4. The absolute position detecting device as claimed in claim 1, wherein said driving means comprises: an encoder plate coupled to an electric motor which drives said object.

5. The absolute position detecting device as claimed in claim 1, wherein said data rewriting operation is carried out simultaneously, immediately before, or immediately after said predetermined point has made one or more revolutions.

6. The absolute position detecting device as claimed in claim 1, wherein said driving means is related to said object such that when said predetermined point on said object returns to an initial position after making one revolution, said driving means returns to an initial rotational angular position, thereby when stopping said object after said predetermined point on said object rotates continuously in one direction passing through said initial position at least once (X), said rewriting means rewrites said count value of said counter with a value that is equivalent to said count value minus the product of a count value representative of one revolution of said predetermined point and the number of times (X) of said predetermined point passed through said initial position.

7. The absolute position detecting device as claimed in claim 1, wherein said driving means is related to said object such that when said predetermined point on said object returns to an initial position after making a plurality of revolutions (X), said driving means returns to an initial rotational angular position, whereby when stopping said object after said predetermined point on said object rotates continuously in one direction passing through said initial position thereof at least a number of times which is the product of said plurality of revolutions (X) and an integer, said rewriting means rewrites said count value of said counter with a value that is equivalent to said count value minus the product of said integer and a count value obtained during said plurality of revolutions (X) of said predetermined point.

8. The absolute position detecting device as claimed in claim 1, wherein said predetermined value is equivalent to the absolute value of a count value representative of at least one revolution of said object and is less than a maximum count value of said counter.

9. The absolute position detecting device as claimed in claim 1, wherein said object is an endless chain.

10. An automatic tool exchanging method having an absolute position detecting device of the type wherein an object is detachably held by a sprocket wheel and at least an idler, a motor having a driving shaft that is coupled to and controllably rotates said sprocket wheel, and a controller for controlling said motor so that a predetermined position of said chain is rotated to a position in accordance with an index, said method comprising the steps of:
(a) causing said chain to rotate to a predetermined position in accordance with said index;
(b) inputting a tool exchanging index;
(c) computing a new index by adding said tool exchanging index with said index;
(d) comparing said new index with a predetermined value, and, if said new index is greater than said predetermined value, performing step (e), otherwise performing step (g);
(e) computing a temporary index by subtracting from said new index said predetermined value;
(f) setting said new index with said temporary index;
(g) rotating said chain in accordance with said new index; and
(h) repeating steps (b)–(g).

* * * * *